Figure 7:
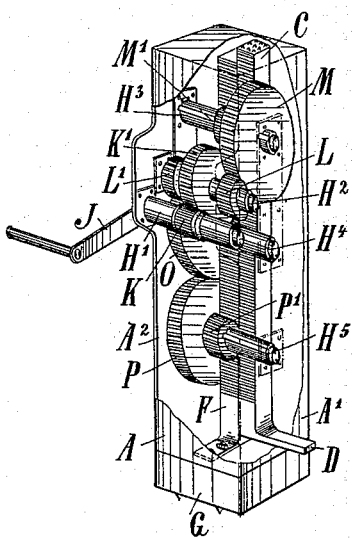

No. 612,079. Patented Oct. 11, 1898.
E. WIGGERSHAUS.
LIFTING JACK.
(Application filed May 28, 1898.)
(No Model.) 2 Sheets—Sheet 1.
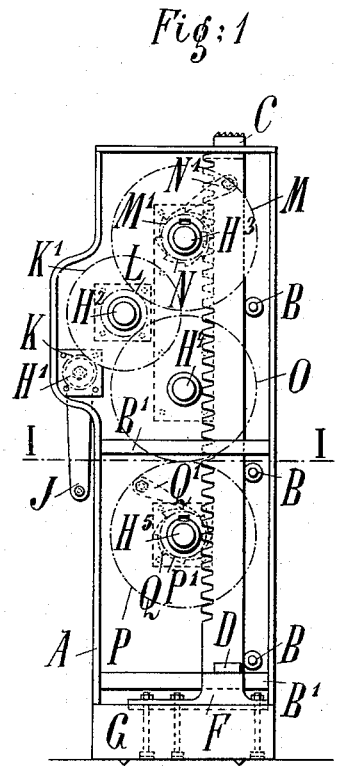
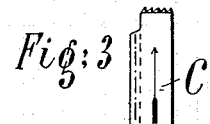
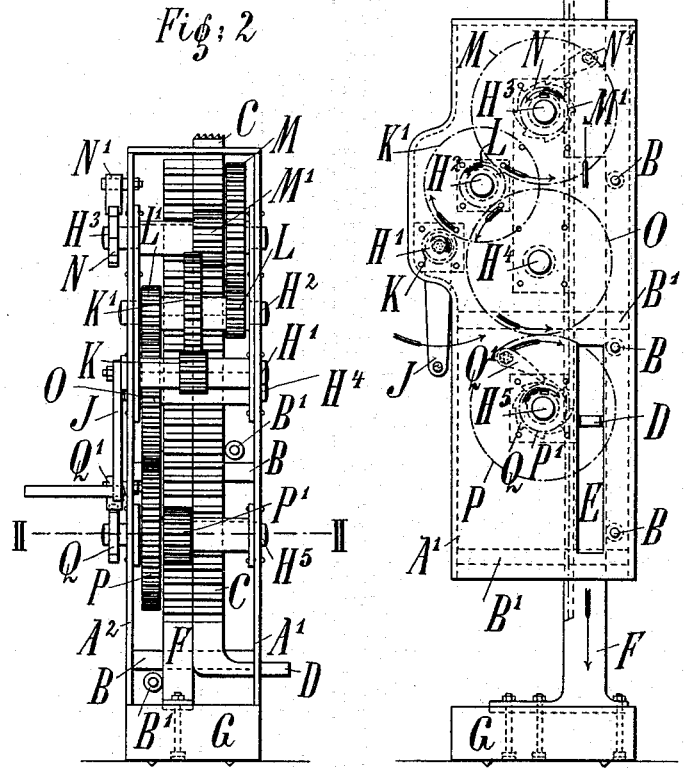
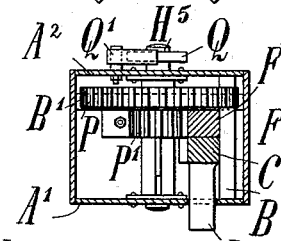
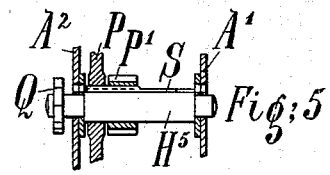
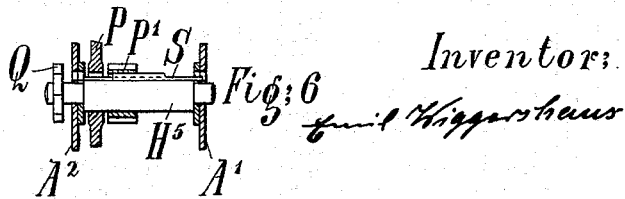

No. 612,079. Patented Oct. 11, 1898.
E. WIGGERSHAUS.
LIFTING JACK.
(Application filed May 28, 1898.)
(No Model.) 2 Sheets—Sheet 2.

Witnesses:

Inventor:
Emil Wiggershaus

UNITED STATES PATENT OFFICE.

EMIL WIGGERSHAUS, OF ELBERFELD, GERMANY.

LIFTING-JACK.

SPECIFICATION forming part of Letters Patent No. 612,079, dated October 11, 1898.

Application filed May 28, 1898. Serial No. 681,985. (No model.)

*To all whom it may concern:*

Be it known that I, EMIL WIGGERSHAUS, a subject of the Emperor of Germany, residing at Elberfeld, in the Province of Rhenish Prussia and Empire of Germany, have invented certain new and useful Improvements in Lifting-Jacks; and I do hereby declare the following to be a full, clear, and exact description of the invention, such as will enable others skilled in the art to which it appertains to make and use the same.

My invention relates to improvements in lifting-jacks; and it has for its object to raise a load to double the height of the length of the rack by using two racks placed side by side, one of them supporting the load and capable of being raised out of the box or casing of the lifting-jack, the other standing on the ground, serving to raise the casing, together with the first-named rack, by a special arrangement of wheels and pinions, which are so fixed on their respective spindles that they can be set in or out of gear, and by a separate set of ratchet-wheels and pawls.

Figure 1 is a side view of the new lifting-jack, both racks and casing in their lowest or turned-down position, one of the side plates taken off. Fig. 2 is a front view of Fig. 1, a front plate taken off. Fig. 3 is a side view showing the casing partly raised and also the respective rack raised out of the casing. Fig. 4 is a cross-section along line I I of Fig. 1. Fig. 5 is a section along line II II of Fig. 2 with the gear-wheel keyed fast in working order. Fig. 6 is a similar section with the key pushed out of working order with the gear-wheel. Fig. 7 is a perspective view, on a small scale.

A is the box or casing of the lifting-jack, which is preferably made of plates riveted or otherwise put together. Stiffening-stays B and B' are placed where found desirable. The top of the casing is closed, but allowing the rack C to pass through. This rack has a claw or foot D at its lower end, passing through a slot E in the side plate A' of the casing. At the bottom the casing is open and the rack F enters therein from below. At its foot this rack is provided with a block G, forming the support and foot-stand of the lifting-jack. It will be seen that both racks C and F are guided by the stays B and B' and that they guide each other.

Crosswise in the casing and journaled in the side plates A' A² are placed the shafts or spindles H', H², H³, H⁴, and H⁵, H' being the first-motion shaft and having the crank-handle J fixed upon it and a pinion K. This pinion gears into the wheel K' upon the spindle H², to which are also keyed the pinions L L', and the first of these again is in gear with the wheel M on the spindle H³, which also carries the pinion M', and this gears into the rack C. At the outer end of spindle H³ is keyed thereon a ratchet-wheel N, working together with a pawl N', conveniently fixed to the casing.

As described so far, it will be easily understood that by turning the handle J in the direction indicated by the arrows, Fig. 3, the rack C will be raised out of the casing, and the ratchet-wheel N and pawl N' will prevent the running back of the rack and the load placed thereon. Now the pinion L' is in gear with the intermediate wheel O on spindle H⁴, and this wheel sets in motion the wheel P or spindle H⁵, to which is keyed the pinion P', which is in gear with the rack F. At the end of spindle H⁵ is a ratchet-wheel Q, working together with a pawl Q', and it will be understood that by turning the handle J, as stated before, the casing, with all parts connected thereto, will be raised or wound up along the rack F, and therefore a load upon the rack C will be raised at double the speed and double the height as in an ordinary lifting-jack with same length of the rack. Now in working, as described before, double the power will be required if the handle is turned at the same speed as in a lifting-jack with a single rack, because the load is raised at double the speed. This is not desirable in all cases, and therefore means are provided allowing slow working by setting out of gear either of the racks F and C until the other has raised the load the height corresponding its length. Thus both racks can be put in gear alternately and the load is raised to the full height of the capacity of this lifting-jack in two periods.

Figs. 5 and 6 show the device for setting in and out of gear the wheel P, permitting this working in two steps. The wheel and pinion P P' are held on the shaft H⁵ by a key S. This key can be shifted in an axial direction, so that the wheel P thereby will be coupled to the shaft, as in Fig. 5, or that it will be free to turn around upon the shaft, as in Fig. 6, and it will be easily understood that when the key S is in the position shown by Fig. 6 the wheel P will be turned around on the shaft H⁵ without setting this in motion, and then of course the pinion P' is also held still and no raising of the casing A takes place. In exactly the same manner the wheel M is keyed to its shaft H³. Hence it follows that a load can be raised by rack C working alone and like in an ordinary lifting-jack in the first period, when the wheel P is held loose on shaft H⁵, and if hereupon the wheel P is keyed fast and the key of wheel M is brought into the position shown in Fig. 5 with regard to wheel P the load can be raised by further turning the handle and by thus raising the casing, together with the rack C.

I am aware that lifting-jacks or similar apparatus working with two racks have been in use, and I do not claim such a lifting-jack broadly; but What I do claim, and desire to secure by Letters Patent as my invention, is—

1. In a lifting-jack, the combination of a slotted casing one of the slots being in the side of said casing, with a rack guided therein and having a foot protruding horizontally at right angles to said rack through said slot, a spindle journaled in the said casing, a train of gearing supported by the said casing and actuated by said spindle, and a pinion driven by said gearing and meshing with the said rack substantially as set forth.

2. In a lifting-jack the combination of a casing with a pair of racks, C, F, arranged side by side therein, extending respectively above and below the said casing and guiding each other, additional means for guiding the said racks within the said casing and shafts and intermediate gearing for moving the said racks in opposite directions substantially as set forth.

3. In a lifting-jack the combination of a hollow casing with racks C and F, arranged therein and working through the top and bottom of it respectively, a spindle H' journaled in said casing and provided with a crank-handle, a pinion K, turning with said spindle, a wheel K', meshing with the said pinion, a shaft H² carrying the said wheel, pinions L, L', turning with the said shaft, a wheel M gearing with pinion L, a shaft H³ carrying said wheel M and journaled in said casing, a pinion M' keyed on the latter shaft and gearing with the rack C, a wheel O gearing with pinion L', a shaft H⁴ carrying this wheel, a wheel P gearing with wheel O, a shaft H⁵ carrying the wheel P, a slidable key S, arranged so that the last-named wheel and shaft will be locked together or left free according to the position of the key, and a pinion P' which is mounted on shaft H⁵ and gears with the rack F substantially as set forth.

4. In a lifting-jack the combination of a casing and a pair of racks protruding through opposite ends of the same, with a driving-shaft and trains of gearing from said shaft to the said racks and means for putting either one of the said racks out of operation at will substantially as set forth.

In testimony whereof I have affixed my signature in presence of two witnesses.

EMIL WIGGERSHAUS.

Witnesses:
  R. E. JAHN,
  OTTO KÖNIG.